United States Patent [19]

Lowry

[11] 4,118,528

[45] Oct. 3, 1978

[54] GLASS FIBER FRICTION FACING

[75] Inventor: Blaine E. Lowry, Manheim, Pa.

[73] Assignee: Raybestos Manhattan, Inc., Trumbull, Conn.

[21] Appl. No.: 819,760

[22] Filed: Jul. 28, 1977

[51] Int. Cl.² .......................... B32B 5/08; B22B 5/26
[52] U.S. Cl. ................................. 428/65; 156/172; 156/175; 156/180; 188/251 A; 192/107 M; 427/407 B; 428/357
[58] Field of Search ............... 156/172, 175, 173, 169, 156/296, 180, 381, 110 A, 110 C; 428/398, 375, 380, 383, 37, 65, 64, 357; 192/107 M; 188/251 R, 215, 251 A; 74/572; 427/178, 177, 302, 407 B, 434; 260/29.3, 38, 845

[56] References Cited

U.S. PATENT DOCUMENTS

| | | | |
|---|---|---|---|
| 2,158,337 | 5/1939 | Rasmussen | 138/250 |
| 3,344,094 | 9/1967 | de Gaugue | 188/251 A |
| 3,365,041 | 1/1968 | Stormfeltz | 192/107 |
| 3,429,766 | 2/1969 | Stormfeltz | 156/169 |
| 3,520,390 | 7/1970 | Bentz | 192/107 |
| 3,526,306 | 9/1970 | Bentz | 192/107 |
| 3,591,357 | 7/1971 | Janetos et al. | 427/407 B |
| 3,600,258 | 8/1971 | Morton | 192/107 M |
| 3,627,606 | 12/1971 | Bentz | 156/184 |
| 3,684,470 | 8/1972 | Marzocchi | 427/407 B |
| 3,713,934 | 1/1973 | Morton | 156/180 |
| 3,718,449 | 2/1973 | Fahey | 427/407 B |
| 3,743,069 | 7/1973 | Barnett | 192/107 M |
| 3,756,910 | 9/1973 | Peters et al. | 156/166 |
| 3,870,581 | 3/1975 | Afflerbach et al. | 156/192 |
| 3,956,545 | 5/1976 | Afflerbach et al. | 428/37 |
| 3,959,194 | 5/1976 | Adelmann | 188/251 A |
| 3,967,037 | 6/1976 | Marzocchi et al. | 428/392 |

OTHER PUBLICATIONS

Rubber Technology, Morton, van Nostrand Reinhold, 2nd ed., 1973, p. 313.

*Primary Examiner*—William A. Powell
*Assistant Examiner*—Michael W. Ball
*Attorney, Agent, or Firm*—Howson and Howson

[57] ABSTRACT

A friction facing for clutches and the like of improved hot burst strength formed of a glass fiber tape disposed in an undulating annular fashion, the undulations being compressed and bonded together by a heat-curable cement system containing rubber, resin and friction modifiers, the rubber being a vulcanizable carboxy nitrile rubber, the resin being a water-soluble, low molecular weight, one-step thermosetting phenol formaldehyde resin, and the friction modifiers being finely divided organic and inorganic particles. In fabricating the friction facings, prior to the application of the heat-curable cement system, there is applied to the glass filaments a precoating comprising rubber, resin and furnace black which is compatible with the cement system and which is applied as an aqueous dispersion.

19 Claims, 4 Drawing Figures

GLASS FIBER FRICTION FACING

BACKGROUND OF THE INVENTION

The present invention relates to friction elements such as clutch facings and the method of making such elements using rovings of continuous glass fibers as both the reinforcing and friction material.

Friction elements, such as automotive clutch facings, are subjected to high rotational and high centrifugal forces which have been known to cause the friction elements to burst.

Major automotive clutch facing manufacturers require that the driven member of the clutch, with two facings attached, be heated to 500° F. for 15 minutes and then be subjected to spin testing as a prerequisite to product acceptance. This hot burst strength is usually the most difficult test to be passed by a friction facing since at elevated temperatures the binder materials such as resin and/or rubber, lose strength rapidly thereby resulting in bursts at relatively low rotational speeds. Conventional clutch facings formed of asbestos yarn having an O.D. of 11 inches and an I.D. of 6½ inches are known to withstand this test up to spin speeds on the order of between 8,000 and 9,000 rpm.

As spin strength requirements for clutch facings became more demanding, glass fibers were used to strengthen the facings while asbestos fibers were retained as the friction material. These endeavors were characterized by high unit costs and in some instances difficulty in keeping the composite structures flat, as for example where a woven glass fabric was applied to the rear surface of the annular asbestos friction element.

More recently it has been suggested to form a clutch facing from a plurality of bundles of parallel continuous glass fibers spirally or randomly wound upon themselves in the form of an annular disc impregnated with heat-curable cement, there being filament means helically encircling portions of the periphery of the glass fiber bundles. Such construction is described in U.S. Pat. Nos. 3,743,069 and 3,756,910. Although such construction is alleged to provide somewhat improved hot burst strengths, as compared to clutch facings formed in large part of asbestos fibers; nevertheless, in the automotive industry clutch facings having even higher hot burst strengths than those provided by clutch facings made in accordance with these patents have been sought.

Applicant's discovery is that friction elements, particularly clutch facings, capable of withstanding the hot burst test at rotational speeds in excess of 12,500 rpm and even as high as 14,500 rpm, while maintaining the same physical dimensions, can be formed from bundles of continuous glass fibers wound randomly upon themselves, provided that said fibers are impregnated with a pre-coat composition comprising rubber, resin and furnace black prior to application of a heat-curable cement system comprising rubber, resin and friction modifiers.

It is an object of this invention to provide a novel glass fiber clutch facings of the above-described type which can be produced relatively inexpensively, yet have substantially increased burst strength.

These and other objects of this invention will become apparent from the following detailed description of the invention and accompanying drawings in which.

DETAILED DESCRIPTION OF THE INVENTION

Figure 1:
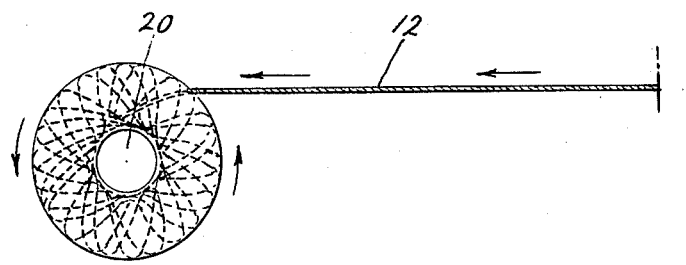
FIG. 1 represents a tape formed of continuous glass fibers impregnated with the heat-curable cement system of this invention wound upon itself into disc-like form.

Referring to the drawings, the reference numeral 10 indicates an annularly shaped disc-like friction element such as a clutch facing.

Figure 2:
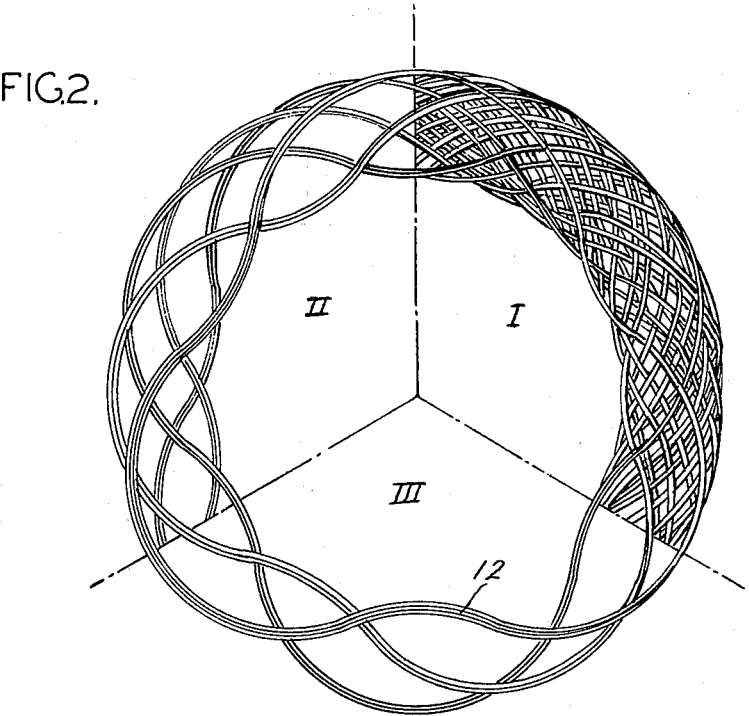
FIG. 2 shows a clutch facing of glass fiber tape impregnated with the heat-curable cement system in three stages of its formation.

The clutch facing is formed by wrapping continuous bundle or tape 12 of generally continuous glass filaments impregnated with the heat-curable cement system in undulating fashion, as shown in FIGS. 1 and 2, to form a disc-like preform which is then consolidated and the cement system is cured by application of heat and pressure.

Continuous tape 12, impregnated with the heat-curable cement system as described more fully hereinbelow, is stored in drums in lengths of several hundred feet. FIG. 1 shows schematically the method by which continuous tape 12 is wound in undulating manner onto a revolving mandrel 20, whereby the tape constantly varies in the instantaneous radius at which it is being wound.

As particularly illustrated in FIG. 2, the clutch facing 10 is shown as having three segments I, II and III, which segments illustrate the complete clutch facing (I), and the intermediate (II) and early (III) stages of formation of the preform.

The tape 12 is formed by combining a plurality of, generally 5 to 10, and preferably 6 to 8, bundles or rovings of continuous glass filaments or fibers.

As used in this specification and appended claims, a "filament" or "fiber" of glass is meant to define a substantially continuous individual fiber of glass having a considerable uninterrupted length, e.g. several thousand feet. A "roving" refers to a collection or assembly of a great number of substantially parallel individual glass filaments. Thus, a roving may include from 100 up to 2000, preferably 1500 to 2000 individual filaments gathered together in any manner well known in the art and technology of glass fiber manufacture. The rovings ordinarily will be free of twist, but may have a relatively small amount of twist not exceeding about one turn per foot. The filaments of which the rovings are formed are extremely fine having diameters ranging from about 10 to 15 microns. Preferably the diameter of the filaments is on the order of 12 to 14 microns.

It is desirable that the glass filaments be first treated in such manner as to enable them to form a strong and permanent bond with the below described pre-coat. This can be accomplished by application of one or more anchoring agents to the filaments just after they are formed.

A suitable anchoring agent is represented by the amino silanes such as gamma-aminopropyltriethoxy silane or by a smilar silane having a carboxyl group in the organic group attached to the silicon atom or an amino or carboxyl group in the carboxylato group of a coordination compound. These may be applied to the glass filament surfaces or incorporated as a component of a size composition. The use of such silanes as anchoring agents is disclosed in U.S. Pat. No. 3,287,204 issued Nov. 22, 1966.

Another treatment to obtain enhanced bonding of the pre-coat to glass filaments involves the application thereto of an aqueous solution of magnesium chloride, zinc chloride, or magnesium hydroxide or zinc hydroxide. After application is made in the form of the chloride, the solution in aqueous medium may be adjusted to an alkaline pH to effect deposition on the glass filaments in the form of the hydroxide. The hydroxides are then converted to the corresponding oxides by heat treatment. This method is described in U.S. Pat. No. 3,311,528 issued Mar. 28, 1967.

The glass filaments or fibers may also be rendered receptive to forming a strong bond with the pre-coat by treating the glass fibers with a size having as an essential ingredient, the reaction product of an imidazoline having a long chain fatty acid group containing at least 5 carbon atoms and an unsaturated polyester resin formed in an uncured state as disclosed in U.S. Pat. No. 3,097,963 issued July 16, 1963.

Other suitable procedures for rendering glass filaments receptive to forming a strong bond with the pre-coat involve the use of a chromic coordination compound having a carboxylate group coordinated with a trivalent nuclear chromium atom in which the carboxylate group is of less than 6 carbon atoms and contains a highly functional group (U.S. Pat. No. 3,552,910), the use of a silane, its hydrolysis products or its polymerization products having at least one of the organic groups attached to the silicon atom containing less than 7 carbon atoms and having been formed with ethylenic unsaturation (U.S. Pat. No. 2,562,288), the use of a silane-organic polymeric compound having film forming properties (U.S. Pat. No. 3,169,884), and the use of a size consisting of an organo silicon compount in the form of a silane, a water dispersible polyvinyl pyrrolidine, gelatin, and a water dispersible polyester resin (U.S. Pat. No. 3,207,623).

This invention is not limited to any specific treatment of the glass filaments, provided the treatment provides the glass filament surfaces with the ability to form a strong bond with the pre-coat.

The pre-coat with which the glass fiber rovings are impregnated contains as essential constituents a vulcanizable carboxy nitrile rubber; a water-soluble, one-step, thermosetting phenol formaldehyde resin, and furnace black, in specified proportions. The pre-coat is applied in the form of an aqueous dispersion which also contains a surfactant.

More particularly the vulcanizable carboxy nitrile rubber is a high strength, oil resistant rubber composed of at least three monomers, namely, acrylonitrile, butadiene and one or more acrylic-type acids. The copolymerization of these monomers produces a chain similar to a normal nitrile rubber except for the carboxyl groups which are distributed along the chain with a frequence of about 1 to every 100 to 200 carbon atoms.

This type polymer is unique in that it can be cured or vulcanized by reactions of the carboxylic group as well as normal sulfur-type vulcanization. One method of curing is to crosslink the chains by neutralizing the carboxylic groups with the oxide or salt of polyvalent metal. The $Ca^{++}$, $Mg^{++}$, and $Pb^{++}$ ions are capable of effecting such a vulcanization reaction. Since the polymer chains also contain double bonds such as occur in butadiene-acrylonitrile rubbers, the normal types of sulfur vulcanization can also be employed. The metal oxide and sulfur-curing systems are applicable to both the dry rubber and latex form of the carboxylated nitrile rubbers.

As compared with a conventional nitrile rubber of equivalent oil resistance, the carboxy modification exhibits much higher tensile strength and modulus, lower elongation, higher hardness, much improved hot tear and tensile, better low-temperature brittleness, improved ozone resistance, and better retention of physical properties after hot-oil and air aging.

The carboxy nitrile rubber is available in the form of a latex which is stable over a pH range of 3.5 to 9.5. As noted above the latex can be cured by means of conventional curing systems such as sulfur, metal oxide and accelerator, or by use of metal oxide alone. In the latex case, 5 to 10 parts per 100 of polymer solids are generally needed.

In addition to carboxy nitrile rubber, the heat-curable cement system contains a water-soluble, one-step, thermosetting phenol formaldehyde resin. This resin, prior to curing, comprises a mixture of phenols reacted with one or more molecules of aldehyde to form compounds such as

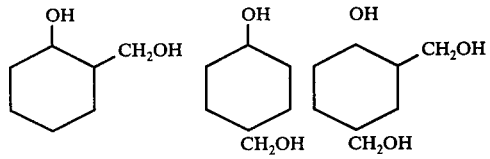

Such resin, cures in one to two minutes on a hot plate at temperatures on the order of about 265–285° F.

Advantageously, both the pre-coat and heat-curable cement systems are applied to the glass filaments in the form of aqueous dispersions, thereby obviating the potential fire and ecological problems presented by the use of organic solvents and making possible reduction in processing costs. In addition, it appears that the improved hot burst strengths obtainable according to this invention are attributable, at least in part, to the use of such aqueous systems. It is believed application of the pre-coat to the glass filaments in the form of an aqueous dispersion may make possible the better wetting of the filaments by the pre-coat by reason of the presence of certain type furnace black and of various surfactants and/or dispersion aids in the dispersions.

Thus aqueous dispersion of the pre-coat used in this invention contains as an essential constituent furnace black having a finite particle size in the range of about 65 to about 85 m$\mu$. A particularly preferred furnace black is one of low color having an average particle size of about 75 m$\mu$, supplied as an anionic dispersion of 50% solids, and having a density of about 10.8 lbs./gal. Applicant believes that the furnace black having the above designated particle size performs the very important function of aiding the rubber and resin constituents of the pre-coat to wet the glass filaments, whereby the hot burst strength of the ultimate clutch facings is considerably enhanced.

The surfactants preferably are of the non-ionic type, exemplary of which is octyl phenoxy polyethoxy ethanol. Representative of useful dispersants are sodium lignin sulfonates and sodium salts of carboxylated polyelectrolytes. These surfactants and dispersants generally may be present in the dispersions in amounts from about 0.25 to about 1.25 percent, by weight, based on the total weight of pre-coat solids.

The pre-coat dispersions may also contain small but effective amounts of various suspending aids such as polyacrylates, sodium carboxymethylcellulose gums and acicular-shaped magnesium aluminum silicate particles.

According to this invention, the pre-coat is applied first to the glass filaments followed by application of the heat-curable cement system. In the pre-coating step, a relatively low solids aqueous dispersion, i.e. one having a solids content of about 10 to 15 percent, preferably 11 to 12 percent, is used. Then in a second coating step in which the heat-curable cement system is applied, a relatively high solids aqueous dispersion is employed, during which latter step the major portion of the binder including friction modifiers is applied to the filaments. In the pre-coating step it is important that the bundles of filaments be opened up or splayed, to provide an opportunity for the pre-coat dispersion to penetrate into the fiber bundle more easily so that all filaments are contacted by the dispersion and pick-up pre-coat solids along their length.

There are various devices in the textile field which are designed to splay or separate bundles of fibers to enhance pick-up of various coating materials. For example the strands or rovings may be passed through a comb-like device before they enter the coater, which generally is of the roller type, whereby the fiber bundles are opened up for intimate contact with the coating composition.

In the pre-coating step, the aqueous dispersion should contain on the order of about 40 to about 50 percent, by weight, of carboxy nitrile rubber, about 40 to 50 percent phenol formaldehyde resin, and about 10 to 20 percent furnace black, said percentages being by weight based on the total weight of cement solids. Preferably, the dispersion contains about 40 to 45 percent of each of the rubber and resin and about 10 to 15 percent of furnace black. Of course, the dispersion should also contain a small amount of a surfactant or dispersant as noted above.

Following the pre-coating operation, the bundles of glass filaments are dried to a moisture content on the order of about 2 to 4 percent, by weight of coated filaments.

The fiber bundles from the pre-coating step, after being dried to the above described extent, will be coated by about 8 to 12 percent, preferably about 10 percent, by weight, based on the weight of uncoated fibers, of pre-coat solids.

Following the pre-coating operation as described herein above, there is applied to the fiber glass rovings the heat-curable cement system. This system is applied as a high solids aqueous dispersion, and generally will comprise from about 6 to about 12 percent carboxy nitrile rubber, about 12 to 16 percent phenolic resin, and about 72 to about 82 percent friction modifiers, based on the total weight of cement solids. Here again the dispersion should contain a small but effective amount of a surfactant or dispersant to enhance wetting of the filaments by the solids.

The heat-curable cement system should also contain curing agents for the rubber and resin, and may also contain accelerators to reduce curing time.

It should be understood that in the cement system the rubber and resin components are the same as those employed in the pre-coat.

Particulate friction modifiers for use in the cement system are well known and include carbon black, graphite, metal oxides, metallic powders, barytes, and the like. In addition the heat-curable cement system may contain well known organic fillers, an example of which is finely divided polymerized cashew nut oil.

The rovings from the second coating step generally will contain about 58 to 63 percent, preferably about 60 to about 62 percent, by weight of uncoated fibers, of cement solids, such amount being the cumulative total of both coating operations.

Following applications of the heat-curable cement system, the rovings are dried to a moisture content on the order of about 2 to 4 percent by weight of coated filaments. When dried to this extent the rovings are somewhat tacky. As will be seen this property enhances the formation of the tape and clutch facing preforms formed thereof.

The rovings to which the heat-curable cement system has been applied and subsequently dried are combined to form a tape by gathering a plurality of rovings, e.g. 6 to 8, by rotating rollers or the like which twist the rovings together. In the resulting tape there will ordinarily be about 3 to 6 turns per linear foot.

If desired, the tape may be provided along its length with one or more helices of non-ferrous metal wire, e.g. brass, copper or lead wire, or of non-metallic material such as cotton, rayon or glass fiber yarn or thread. Such helices may be applied to the tape in the manner disclosed in U.S. Pat. No. 3,756,910 or in other suitable manner as by braiding. The non-metallic helices can provide improved frictional properties, whereas the metal wire produces both improved friction and heat dissipation properties but, because of the additional weight, may reduce hot burst strength properties to some degree. Preferably there is applied to the tape a plurality of helices of copper wire so that the total weight of wire is from about 10 to about 20 percent, by weight of coated tape.

As noted above, the tape formed of continuous glass filaments and impregnated with the heat-curable cement system is wound in undulating fashion onto a revolving mandrel in such manner that the convolutions of the tape vary in the instantaneous radius at which they are being wound. This arrangement is best illustrated in FIG. 2 of the drawings. The resulting disc-shaped friction facing preform is then placed in a mold and heated at elevated temperatures in the range of about 350° to 375° F., under a pressure of about 3500 to 5000 psi for a short period of time, e.g. 2–3 minutes to consolidate and densify the preform and at least partially cure the binder. Subsequently, the resulting facings are placed in an oven heated to a temperature of about 400° to 450° F. where they remain for several hours. During this latter heat treatment the resin is converted into the infusible, insoluble state and the rubber is vulcanized.

Figure 3:
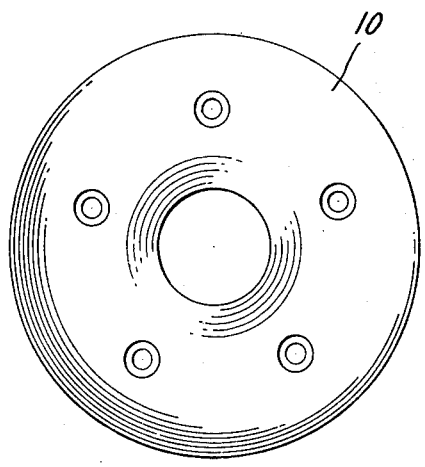
FIG. 3 is an elevation or face view of a clutch facing according to this invention.
Figure 4:
FIG. 4 is a side or edge view of the clutch facing shown in FIG. 3.

The clutch facings are then subject to conventional mechanical processing such as grinding to achieve acceptable tolerances, and drilled to provide holes by means of which the facings are attached to the power train of an internal combustion engine (see particularly FIGS. 3 and 4).

EXAMPLE I

This example describes the preparation of clutch facings according to this invention.

In preparing these clutch facings glass fiber roving comprising about 2000 ends of continuous glass filaments having an average diameter of about 13 microns were used. The surfaces of the filaments of the rovings had been chemically treated previously to render them capable of forming a strong bond with the pre-coat below described.

A number of the glass fiber roving were paid off a creel and passed through tensioning devices and ceramic guides to the coater. Each end of the roving prior to entering the coater was splayed so that the filaments would be wet with the pre-coat. Excess pre-coat was then removed.

The coating composition comprised an aqueous dispersion containing about 10 weight percent of the following solids and about 1 percent surfactant:

| Constituent | Weight Percent |
| --- | --- |
| Carboxy nitrile rubber | 42.8 |
| Water-soluble, heat-curable, phenol-formaldehyde resin | 42.8 |
| Furnace black* | 14.4 |
| | 100.0 |

*Low color furnace black having finite particle size of about 75 mµ supplied as an anionic dispersion of 50% solids, density 10.8 lbs./gal.

After leaving the pre-coater, the rovings were dried by infra red means whereby sufficient water was removed to reduce the moisture content of the rovings to about 4%, by weight, based on the weight of the coated filaments.

The dried rovings, which contained about 10 weight percent of pre-coat solids, were then passed to a roller coater in which there was an aqueous dispersion containing approximately 54 weight percent total of the following solids:

| Constituent | Weight Percent |
| --- | --- |
| Carboxy nitrile rubber and curing agent | 11.4 |
| Water-soluble phenol-formaldehyde resin | 14.4 |
| Particulate friction modifiers | 70.6 |
| Dispersing agent | 1.9 |
| Suspending agent | 1.7 |
| | 100.0 |

The impregnated rovings were passed through a tunnel drier where the moisture content thereof was again reduced to about 4 weight percent. This quantity of residual moisture imparts a tackiness to the filaments sufficient to render them pressure sensitive so that they adhere to one another. The rovings contained about 61 percent of the above cement system, based on the weight of glass fibers.

A tape was formed by gathering the rovings by means of two pair of rotating rolls which twisted the rovings together to provide the resulting tape with about 3 twists per foot.

The tape was wound in undulating fashion to form a number of disc-shaped friction facing preforms which were placed in molds heated 360° F. where they were subjected to a pressure of 5000 psi for slightly more than 2 minutes to effect densification of the preform and partial cure of the cement system. Subsequently the clutch facings were further heated at 400-450° F. for about 5½ hours to convert the resin into the infusible, insoluble state and to vulcanize the rubber. The clutch facings were ground to the following dimensions: O.D. 11 inches; I.D. 6½ inches; thickness 0.137 inch.

EXAMPLE II

The clutch facings produced according to Example I were tested for high temperature burst strength using the following procedure.

Each clutch facing was riveted to the driven member making certain the rivets were properly tightened. The mounted clutch facing was then heated for 15 minutes in a circulating air oven maintained at 500° F. The mounted clutch facing was removed from the oven and promptly (within 15 seconds) mounted on the shaft of a Centrifugal Burst Machine. The test was immediately begun and the driven member to which the test clutch facing was mounted reached 3500 rpm approximately 2 seconds. Thereafter the speed of the driven member was increased at an average rate of approximately 135 rpm/sec. until the clutch facing burst, at which time the speed of rotation was recorded.

The burst strength data obtained are set forth in Table I, below.

EXAMPLE III

A number of clutch facings were prepared using the material and procedures described in Example I. The clutch facings had the following dimensions: O.D. 9 1/16 inches; I.D. 6 inches; thickness 0.125 inch. The clutch facings were tested for burst strength using the procedure described in Example II. The results obtained are given in Table I, below:

Table I

| Clutch Facing Dimensions | Hot Burst Strength (rpm) |
| --- | --- |
| 11 × 6 1/2" × 0.137" (Example I) | 13,200 |
| | 12,900 |
| | 13,000 |
| | 12,600 |
| | 12,800 |
| | 12,900 (ave.) |
| 9 1/16" × 6" × 0.125" (Example III) | 13,400 |
| | 14,400 |
| | 14,500 |
| | 13,400 |
| | 14,500 |
| | 14,000 (ave.) |

EXAMPLE IV

A number of clutch facings were prepared using the materials and procedures described in Example I only with the following additional step. An overlay of 18 percent copper wire was applied to the treated fiberglass tape by means of a braiding device for the purpose of improved heat dissipation. The clutch facings had the following dimensions: O.D. 11 inches; I.D. 6½ inches; thickness 0.137 inch. The clutch facings were tested for burst strength using the procedure described in Example II. The results obtained are given in Table II below:

Table II

| Clutch Facing Dimensions | Hot Burst Strength (rpm) |
| --- | --- |
| 11 × 6 1/2 × .137" | 11,200 |
| | 11,300 |
| | 11,400 |
| | 11,300 (ave.) |

It will be apparent from the foregoing that there are provided hereby novel clutch facings of improved physical properties.

It will be understood that various changes may be made in the details of construction, arrangement and in the processing steps for manufacture of clutch facings according to this invention without departing from the spirit of the invention, especially as defined in the following claims.

What is claimed is:

1. A disc-shaped friction facing having an inner diameter and an outer diameter, said facing comprising
    a tape impregnated with a heat-curable cement system and disposed in an undulating annular fashion and having been subjected to heat and pressure to compress said tape to form a disc-shaped facing and to cure said cement, said tape comprising
    a plurality of rovings of substantially continuous glass filaments having been impregnated with a pre-coat composition and then impregnated with a heat-curable cement system, each impregnation having been accomplished by passing said rovings through aqueous dispersions of the respective pre-coat composition and cement system, said dispersions containing from about 0.25 to about 1.25 percent, by weight of solids, of a surfactant or dispersant, and the surfaces of said filaments prior to said impregnations having been treated with an anchoring agent capable of providing a strong bond between said filament surfaces and said pre-coat composition, said pre-coat compositions comprising from about 40 to about 50 percent of a vulcanizable carboxy nitrile rubber, from about 40 to about 50 percent of a watersoluble, low molecular weight, one-step phenol formaldehyde resin and from about 16 to about 20 percent furnace black having a particle size in the range of about 65 to about 85 m$\mu$, said percentages being by weight based on the combined weight of said pre-coat constituents, and said cement system comprising from about 6 to about 12 percent of said vulcanizable rubber, from about 12 to about 16 percent of said phenol formaldehyde resin, and about 72 to 82 percent particulate friction modifiers, said percentages being by weight, based on the combined weight of said constituents forming said cement system.

2. A friction facing according to claim 1 in which said pre-coat composition comprises about 40 to 45 percent rubber, about 40 to 45 percent resin, and about 10 to 15 percent furnace black.

3. A friction facing according to claim 1 in which said tape contains a total of from about 58 to about 63 percent by weight of pre-coat and heat-curable cement system, based on weight of uncoated filaments.

4. A friction facing according to claim 1 in which said tape comprises from about 5 to about 10 ends of said impregnated glass fiber rovings, each of said rovings comprising from about 100 to 2000 substantially continuous glass filaments having a diameter of from about 10 to about 15 microns.

5. A friction facing according to claim 4 in which said tape comprises from about 6 to about 8 ends of impregnated glass fiber rovings, each of said rovings comprising from about 1500 to 2000 continuous glass filaments having a diameter of about 12 to 14 microns.

6. A friction facing according to claim 1 in which at least one helix of continuous filamentary material is wrapped around said impregnated tape prior to winding said tape to form a disc-shaped friction facing.

7. A friction facing according to claim 6 in which said filamentary material comprises metal wire.

8. A friction facing according to claim 1 in which a braid of metal wire is applied to said impregnated tape prior to winding said tape to form a disc-shaped friction facing.

9. A friction facing according to claim 1 in which a braid of non-metallic filaments is applied to said impregnated tape prior to winding said tape to form a disc-shaped friction facing.

10. The method of forming an annular friction facing for a clutch or the like comprising the steps of:

(A) impregnating plurality of rovings formed of substantially continuous glass filaments with a pre-coat composition comprising about 40 to about 50 percent of a vulcanizable carboxy nitrile rubber, about 40 to about 50 percent of a water soluble, low molecular weight, one-step thermosetting phenol formaldehyde resin, and about 10 to about 20 percent of furnace black having a particle size in the range of about 65 to about 85 m$\mu$, said percentages being by weight, based on the combined weight of said components, by passing said rovings through a low solids aqueous dispersion of said pre-coat composition containing from about 0.25 to about 1.25 percent, based on weight of pre-coat solids, of a surfactant or dispersant, the surfaces of said filaments of said rovings having been treated with an anchoring agent capable of providing a strong bond between said filaments and said pre-caot composition;

(B) drying said pre-coat impregnated rovings to a moisture content in the range of about 2 to about 4 percent, by weight of said coated rovings;

(C) further impregnating said pre-coat impregnated rovings with a heat-curable cement system comprising from about 6 to about 12 percent of a vulcanizable carboxy nitrile rubber, from about 12 to about 16 percent of a water-soluble, low molecular weight one-step, thermosetting phenol formaldehyde resin, and from about 72 to about 82 percent of particulate friction modifiers, said percentages being by weight, based on the combined weight of said components of said cement system, by passing said rovings through a high solids aqueous dispersion of said cement system containing from about 0.25 to about 1.25 percent, based on weight of cement system solids, of a surfactant or dispersant;

(D) drying said rovings impregnated with said heat-curable cement system to a moisture content of about 2 to about 4 percent, by weight of said impregnated rovings;

(E) combining a plurality of said impregnated rovings to form a tape;

(F) winding said tape in undulating fashion to form a disc-shaped friction facing preform; and (G) subjecting said preform to heat and pressure to densify said preform and cure said cement.

11. The method of claim 10 in which said aqueous dispersion of step (A) has a solids content of from about 10 to about 15 percent, by weight.

12. The method of claim 11 in which said pre-coat composition of step (A) comprises about 40 to 45 percent rubber, about 40 to 45 percent resin, and about 10 to 15 percent furnace black.

13. The method of claim 10 in which said rovings from step (C) contain a total of from about 58 to about 63 percent by weight of pre-coat and heat-curable cement system, based on weight of uncoated filaments.

14. The method of claim 10 in which said tape is obtained by combining from about 5 to about 10 ends of said impregnated glass fiber rovings, each of said rovings comprising from about 100 to 2000 substantially continuous glass filaments having a diameter of from about 10 to about 15 microns.

15. The method of claim 14 in which said tape is formed by combining from about 6 to about 8 ends of impregnated glass fiber rovings, each of said rovings comprising from about 1500 to 2000 continuous glass filaments having a diameter of about 12 to 14 microns.

16. The method of claim 10 in which at least one helix of continuous filamentary material is wrapped around said impregnated tape prior to winding said tape to form a friction facing preform.

17. The method of claim 16 in which said filamentary material comprises metal wire.

18. The method of claim 10 in which a braid of metal wire is applied to said impregnated tape prior to winding said tape to form a friction facing preform.

19. The method of claim 10 in which a braid of non-metallic filaments is applied to said impregnated tape prior to winding said tape to form a friction facing preform.

* * * * *